Figure 1:
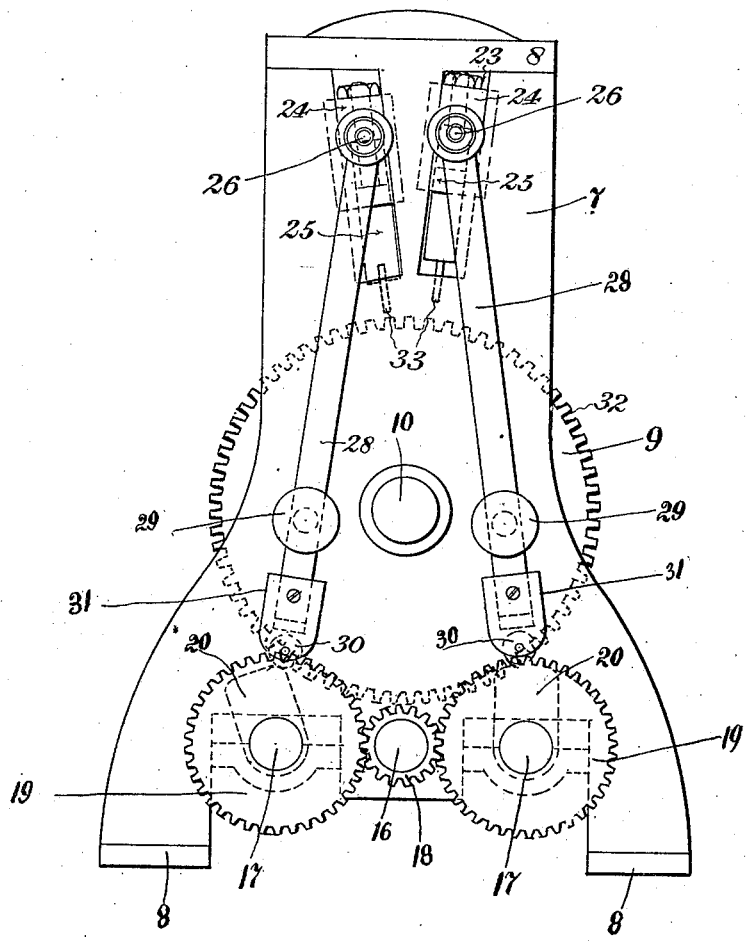

No. 686,743. Patented Nov. 19, 1901.
J. J. LAMBERT.
MACHINE FOR MAKING TRIMMINGS.
(Application filed July 23, 1901.)
(No Model.) 5 Sheets—Sheet 1.

WITNESSES:

INVENTOR
Julius J. Lambert
BY
Edgar Tate & Co
ATTORNEYS.

No. 686,743. Patented Nov. 19, 1901.
J. J. LAMBERT.
MACHINE FOR MAKING TRIMMINGS.
(Application filed July 23, 1901.)
(No Model.) 5 Sheets—Sheet 2.

WITNESSES: INVENTOR
Julius J. Lambert
BY
Edgar Tate & Co
ATTORNEYS

No. 686,743.  
J. J. LAMBERT.  
MACHINE FOR MAKING TRIMMINGS.  
(Application filed July 23, 1901.)

Patented Nov. 19, 1901.

(No Model.)

5 Sheets—Sheet 3.

Fig. 3

WITNESSES:

INVENTOR  
Julius J. Lambert  
BY Edgar Tate & Co.  
ATTORNEYS

No. 686,743. Patented Nov. 19, 1901.
J. J. LAMBERT.
MACHINE FOR MAKING TRIMMINGS.
(Application filed July 23, 1901.)
(No Model.) 5 Sheets—Sheet 4.
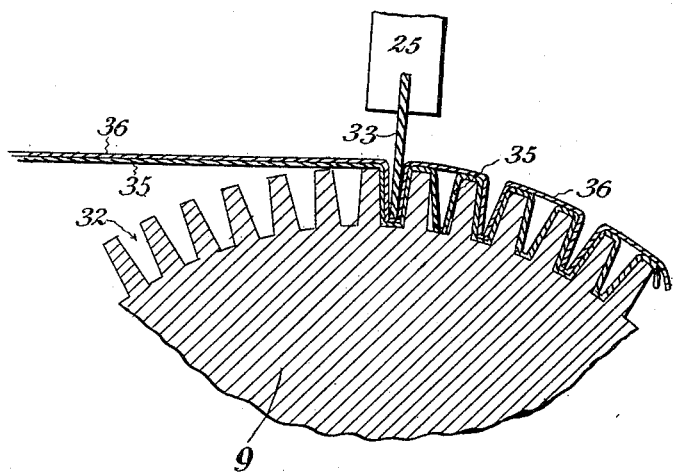
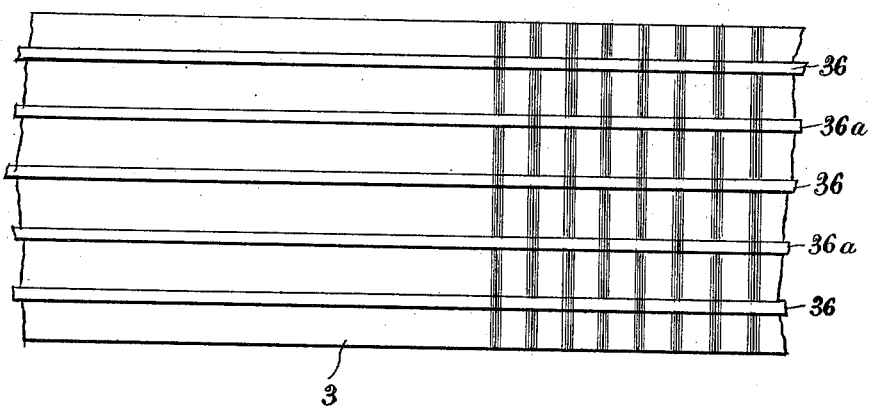
WITNESSES:
INVENTOR
Julius J. Lambert.
BY Edgar Tate
ATTORNEYS No. 686,743. Patented Nov. 19, 1901.
J. J. LAMBERT.
MACHINE FOR MAKING TRIMMINGS.
(Application filed July 23, 1901.)
(No Model.) 5 Sheets—Sheet 5.
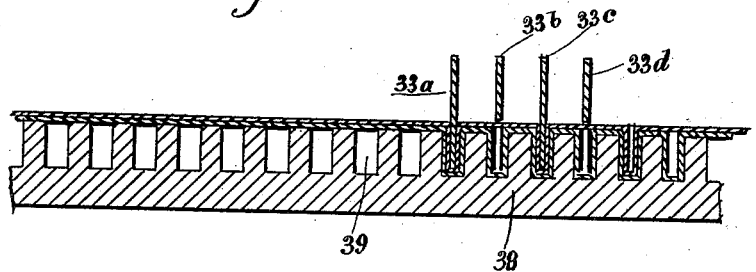
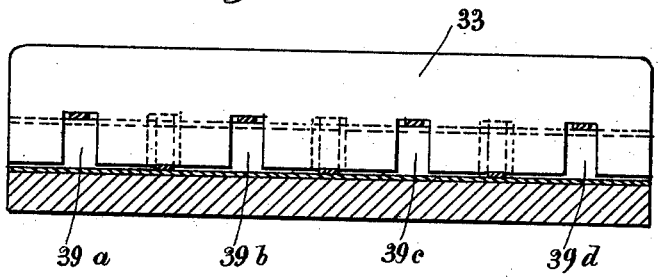
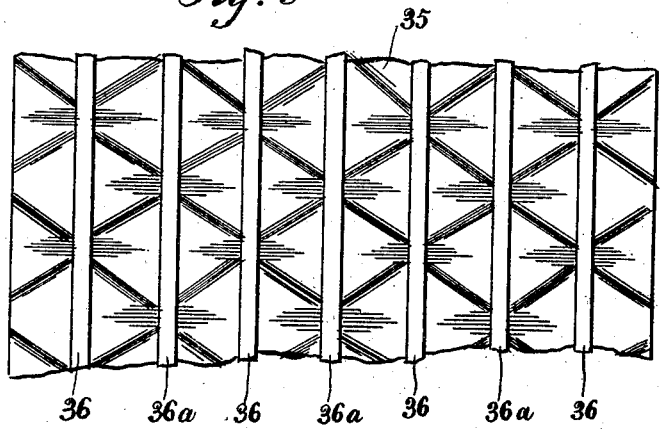
WITNESSES:
F. A. Stewart
F. F. Seller
INVENTOR
Julius J. Lambert
BY
Edgar Tate & Co
ATTORNEYS

UNITED STATES PATENT OFFICE.

JULIUS J. LAMBERT, OF NEW YORK, N. Y., ASSIGNOR TO HIMSELF AND MORRIS FRANK, OF NEW YORK, N. Y.

MACHINE FOR MAKING TRIMMINGS.

SPECIFICATION forming part of Letters Patent No. 686,743, dated November 19, 1901.

Application filed July 23, 1901. Serial No. 69,459. (No model.)

*To all whom it may concern:*

Be it known that I, JULIUS J. LAMBERT, a citizen of the United States, residing at New York, in the county of New York and State of New York, have invented certain new and useful Improvements in Apparatus for Making Trimmings, of which the following is a full and complete description of the specification, such as will enable those skilled in the art to which it appertains to make and use the same.

This invention relates to machines or appliances for crimping, smocking, or honeycombing cloth, so as to prepare it for use in lining caskets and for various other purposes; and it has for its object to provide an improved means for making such cloth in a simple, effective, and inexpensive manner.

My invention is broad in its plan and scope, but is in general an improvement upon the machine for making trimmings issued to myself and another as assignees of Harry Taylor Loomis, which said patent bears date of the 25th day of July, 1899, and is numbered 629,451. In that machine a smocking-cylinder was constructed or molded of a form to correspond with the embossed surface or irregularities of the trimming which is desired to be produced, and plungers, provided at their lower ends with crimping or smocking heads, were brought down upon the said cylinder, thereby shaping the goods. In my present invention, however, the smocking-cylinder is transversely grooved and the cloth and the adhesive tapes are depressed in the grooves of the cylinder by plates, which are so formed and constructed as to depress every alternate tape, leaving the intervening tapes undepressed, and then on actuation of the succeeding plate to depress in the next succeeding groove both the cloth and the tapes not depressed by the first plate and leaving undepressed the tapes which were depressed with the cloth into the previous groove of the smocking-cylinder by the said first plate, whereby after such continuous alternate action upon the tapes the cloth may be removed from the cylinder and stretched out as far as the tapes will permit, whereupon it will be produced permanently in the form of smocked or honeycombed fabric of this type.

My invention consists, primarily, in the broad means or elements specified whereby this manipulation of the cloth is accomplished, and it further consists in the novel construction and arrangement of parts hereinafter fully described.

Figure 2:
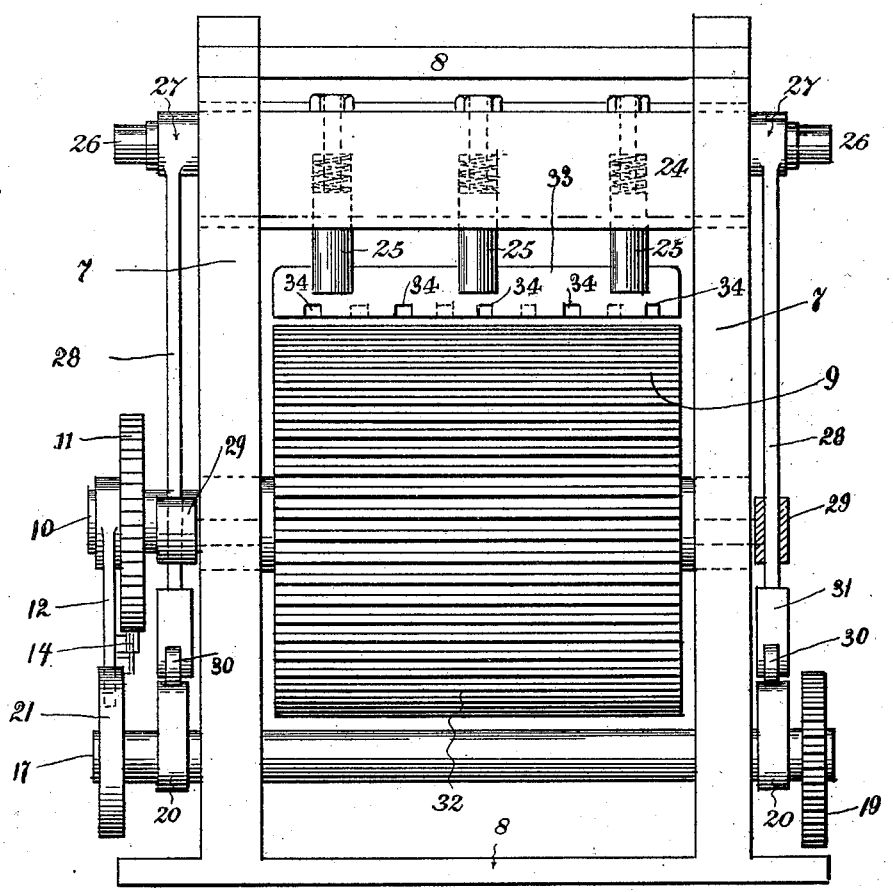

In the accompanying drawings, forming part of this specification, in which like numerals of reference designate corresponding parts in the several views, Figure 1 is an end elevation of a machine embodying my invention. Fig. 2 is a front end elevation thereof. Fig. 3 is an end elevation opposite to that shown in Fig. 1. Fig. 4 is a sectional detail. Fig. 5 is a plan view of Fig. 4. Fig. 6 is a detail of a gas-burner forming part of the invention. Fig. 7 is a side elevation of a modified form of the device. Fig. 8 is a transverse central section thereof, and Fig. 9 is a plan view showing the cloth as it appears after treatment.

In the practice of my invention I provide a frame comprising vertical sides 7, connected at the top and bottom by cross-pieces 8, and mounted centrally of this frame is a cylinder 9, the shaft 10 of which projects at one side and is provided with a ratchet-wheel 11. Secured to the shaft 10 outside of said ratchet-wheel is an arm 12, which projects downwardly and is normally drawn to the right by a spring 13, and pivotally connected with said arm is a pawl 14, normally raised by a fulcrum-spring 15, which is mounted upon the arm 12 beneath the said pawl, and this pawl operates, in connection with the ratchet-wheel 11, to turn the cylinder 9 in the required direction, as hereinafter described.

Directly below the shaft 10 near the bottom of the main frame is mounted a power-shaft 16, and at each side of said power-shaft and in the same horizontal plane therewith is a supplemental shaft or counter-shaft 17.

The power-shaft 16 is provided at one end with a pinion 18, (best shown in Fig. 1,) and the adjacent ends of the supplemental shafts 17 are each provided with a corresponding spur gear-wheel 19, and by means of this arrangement the supplemental shafts 17 are revolved by the main power-shaft 16. Each of the shafts 17 is provided outside of the sides 7 of the main frame with a cam 20, and in the normal position of these shafts the cams 20 are turned substantially in the same direction, the cams on one shaft in the operation of the said shafts being slightly in advance of those upon the other. The end of one of the shafts 17 adjacent to the ratchet-wheel 11 on the shaft 10 of the cylinder 9 is provided with a cam-wheel 21, provided at one side thereof with a cam-shaped projection 22, which operates in connection with the arm 12 on the shaft 10 of the cylinder 9 and which at each revolution of the shafts 17 forces the arm 12 to the left and turns the cylinder 9 through a partial revolution, the spring 13 operating at all times to return the arm 12 to the position shown in Fig. 3.

The sides of the main frame are provided at or near the top with outwardly and upwardly inclined slots or openings 23, and mounted therein are vertically-movable cross-heads 24, in each of which cross-heads are mounted a plurality of spring-depressed plungers 25. Passing through each of the said cross-heads is a shaft 26, the ends of which project through the slots or openings 23 in the sides of the main frame 7, or said shafts may consist of tenons secured to the ends of said cross-heads, and connected with each of the ends of said shafts outside of the sides of the main frame by means of collars 27 are downwardly-directed operating-rods 28, which pass through guides 29, pivotally connected with the sides 7 of the main frame and adapted to turn upon their connections. The lower end of each of said operating-rods 28 is provided with a friction-roller 30, the said rollers being carried by bearing-sleeves 31, secured to the lower ends of said operating-rods. These rollers rest upon the cams 20. The smocking-cylinder 9 is cylindrical in form and provided with a series of equidistant and parallel transversely-ranging grooves 32 throughout its entire periphery or surface.

Each of the spring-depressed plungers 25 is secured at its lower end to a plate 33 of a length approximately equal to the width of the cylinder 9 and of a thickness adapted to enter the grooves 32 therein. There are two of these plates provided. Each of the plates 33 is provided with a plurality of equidistant slots or notches 34. The distance between the slots or notches is predetermined according to the dimensions of the embossed portions of the smocked fabric which is to be produced by the machine. This fabric is shown in inverted plan view in Fig. 9, from which it will be seen that the cloth 35 is crimped or brought together at equidistant intervals and secured by adhesive tapes 36, arranged at distances corresponding to the distance between the slots or notches 34, and midway between these tapes the fabric is crimped at equidistant points midway between the crimped points traversed by the tapes 36, and upon these last-crimped portions tapes 36$^a$ are secured. Any suitable adhesive tapes may be employed. The slots or notches 34 of each plate are arranged alternately of the slots or notches of the opposite plate, so that the slots of one plate will always lie over the tapes 36, while the slots of the opposite plates will lie over the intermediate tapes 36$^a$.

In the drawings I have shown the shafts 26 of the movable cross-heads 24 hollow and provided with gas-tubes 37, a detailed view of which is given in Fig. 6 and which are perforated and serve as burner-tubes and by means of which said movable cross-heads and the plungers 25, together with the plates 33, are heated to any desired extent. While this feature was generally quite necessary in the previously-patented machine to which I have referred, it will not be absolutely essential in the present invention and may be omitted.

The operation of the device will be readily understood from the foregoing description, taken in connection with the accompanying drawings, and the advantages resultant from the use thereof will be manifest to all who are conversant with devices of this character.

The main power-shaft 16 is operated in any desired manner and communicates its motion to the counter-shafts 17. At each revolution thereof the cross-heads 24 are forced upwardly by the cams 20, acting upon the rods 28, and descend by their own weight. This operation of said cross-heads is substantially simultaneous; but in the vertical movement of said cross-heads one is slightly in advance of those on the other shaft. As the machine is thus operated a strip of the cloth to be crimped is passed over the cylinder 9, with the several tapes laid lightly thereon with their adhesive surfaces in contact with the fabric. As the plungers descend the cloth and the tapes will be first pressed downwardly by one of the plates 33, thereby forcing the cloth and the tapes 36 or 36$^a$ downwardly into one of the grooves of the cylinder.

Assuming that the tapes 36 are depressed, the slots or notches 34 will permit the tapes 36$^a$ to lie therein and they will not be depressed with the cloth. Almost immediately afterward the second plate 33 will force the cloth and the tapes 36$^a$ downwardly into the next succeeding groove of the cylinder, the slots or notches 34 in this case permitting the tapes 36 to lie undepressed. The plates and plungers are then raised by the continued operation of the shafts 17, and after one complete revolution of these shafts the projection 22 of the cam 21, striking against the arm 12 of the cylinder-shaft 10, turns the said cylinder a distance equal to two grooves, and after the projection 22 has passed by the said arms 12 the latter is retracted by its spring 13 and draws its pawl 14 over the teeth of the ratchet-wheel 11. This operation continues until the entire strip of cloth has been depressed into the grooves of the cylinder, and thereby crimped and the adhesive tapes secured thereto, as described. When the fabric is removed from the machine, it is pulled out or stretched as far as the tapes will permit it, so that the portions of the cloth beneath the depressed portions of the several tapes will be expanded or drawn out into the smocked or diamond-shaped form shown in Fig. 9, while those portions where the tapes have not been depressed will be engaged by the tapes and prevented from expanding. When the fabric is thus pulled out, the adhesive tapes may be pressed down more closely to the goods.

It will be particularly observed that by my novel plan of depressing alternate tapes the tapes in the finished product are continuous with the length of the goods. I am aware that it has been proposed to run the tapes across only the upraised edges of the fabric and cut the alternate tapes so as to permit the stretching of the fabric after it is removed from the machine. This plan does not, however, depress the tapes in the grooves of the smocking-cylinder, nor particularly does it depress alternate tapes therein. It will especially be observed that the strips of tape in my invention are secured to the fabric not only at its upraised portion or edges, but also throughout its entire length in the path followed by the tape. Not only is my invention simpler by reason of this novel plan, but, moreover, when the fabric is stretched after its removal from the machine it is stretched uniformly, and the tapes limit the extent of stretching and when pressed down will hold the fabric in stretched form or smocked condition.

In Figs. 7 and 8 I have shown a modified form of my invention, which is adapted for manipulation of the making of the fabric by hand. In this case instead of a rotating cylinder 9 I use a flat bed or table 38, formed with parallel and equidistant transversely-ranging grooves 39 and press down one after the other a plurality of the plates 33 detached. It will be manifest that for making small quantities of cloth this modified form of the device will operate in a similar manner to produce the fabric.

I do not desire to confine myself to the exact construction and arrangement of parts herein shown and described, as I conceive my invention to be novel in its plan and broad in its scope.

Having thus fully described my invention, what I claim as new, and desire to secure by Letters Patent, is—

1. An apparatus for making trimmings which comprises a bed provided with a plurality of transversely-ranging grooves and one or more plates adapted to enter said grooves and depress therein the fabric and alternate adhesive tapes which form the completed goods; the said plate or plates being provided with recesses or slots to receive therein alternate tapes whereby they remain undepressed.

2. An apparatus for making trimmings comprising a bed provided with a plurality of transversely-ranging successive grooves and a plurality of plates adapted to enter the said grooves to depress thereinto the fabric and adhesive tapes which form the completed goods; the said plates being provided upon their lower or effective edges with recesses or slots adapted to receive certain of the tapes therein whereby they remain undepressed; and the slots or recesses of adjacent or successive plates being arranged alternately or each intermediate of the slots of the opposite plate whereby each of the tapes is alternately depressed and undepressed by the action of the successive plates.

3. An apparatus for making trimmings which comprises a movable bed provided with a plurality of transversely-ranging grooves arranged at equidistant intervals, means for imparting movement intermittently to the said bed, a plurality of plates adapted to enter the said grooves and provided with recesses or slots in the lower or effective edges thereof, and arranged alternately to leave undepressed alternate of the tapes which form part of the fabric and means for depressing the said plates into the grooves between the movements of the bed.

4. An apparatus for making trimmings comprising a rotating bed or cylinder formed with a series of transversely-ranging equidistant grooves upon its outer periphery, means for rotating said cylinder at intervals, a pair of plungers vertically movable with respect to the said cylinder, plates mounted respectively on the said plungers and adapted when the latter are depressed to enter adjacent grooves upon the cylinder, the said plates being formed in their lower or effective edges with recesses or slots and the said recesses or slots of one plate being intermediate of those of the opposite plate and means for depressing and raising said plungers between the intermittent movements of the cylinder.

5. An apparatus for making trimmings which comprises a bed provided with a plurality of transversely-ranging grooves adapted to receive therein the fabric, and adhesive tapes which form the completed goods, and means for depressing the fabric completely and the adhesive tapes alternately in the grooves in the bed whereby certain of the tapes remain undepressed and secured to the upraised edges of the fabric while the depressed tapes are secured also to the depressed portions of the fabric.

6. An apparatus for making trimmings which comprises a bed provided with a plurality of transversely-ranging grooves adapted to receive therein the fabric and adhesive tapes which form the completed goods, and means for depressing the fabric completely and the adhesive tapes alternately in the grooves in the bed, whereby certain of the tapes remain undepressed and secured to the upraised edges of the fabric while the depressed tapes are secured also to the depressed portions of the fabric, and means whereby the depression and non-depression of the tapes is alternated upon or relatively to each of the tapes, whereby each tape will be depressed in one groove and passed undepressed over the next groove in succession.

In testimony that I claim the foregoing as my invention I have signed my name, in presence of the subscribing witnesses, this 16th day of July, 1901.

JULIUS J. LAMBERT.

Witnesses:
HUGO KANZLER,
MINNIE ROOS.